United States Patent [19]

Suzuki

[11] Patent Number: 4,642,939
[45] Date of Patent: Feb. 17, 1987

[54] SPROUTING VEGETABLE CULTIVATION APPARATUS

[75] Inventor: Tomosaburo Suzuki, Tsukui, Japan

[73] Assignee: Kabushiki Kaisha Daisei Kikai, Tokyo, Japan

[21] Appl. No.: 718,372

[22] Filed: Apr. 1, 1985

[30] Foreign Application Priority Data

Apr. 25, 1984 [JP] Japan ................................. 59-83211

[51] Int. Cl.⁴ .............................................. A01C 1/00
[52] U.S. Cl. ........................................... 47/14; 47/61
[58] Field of Search ................... 47/14, 15, 16, 59, 60, 47/61, 62, 63, 64

[56] References Cited

U.S. PATENT DOCUMENTS 1,909,408  5/1933  Jones ........................................ 47/14
3,911,619 10/1975  Dedolph ................................. 47/14

FOREIGN PATENT DOCUMENTS 1027759  3/1978  Canada ..................................... 47/65
1099052  8/1955  France ..................................... 47/65
1005735  3/1983  U.S.S.R. .................................. 47/65

Primary Examiner—Robert A. Hafer
Assistant Examiner—Bradley M. Lewis
Attorney, Agent, or Firm—Oblon, Fisher, Spivak, McClelland & Maier

[57] ABSTRACT

A sprouting vegetable cultivation apparatus which includes a rotary drum for growing a sprouting vegetable, a pipe-shape guide positioned at the center of rotation of the rotary drum and having an opening formed along a longitudinal direction thereof, and a water spray pipe arranged inside the pipe-shape guide for spraying water into the rotary drum through the opening. The rotary drum includes a plurality of partition plates extending on its interior in the longitudinal direction. In addition, at least one perforated board can be provided on an inner surface of the rotary drum at an interval spaced therefrom.

3 Claims, 4 Drawing Figures

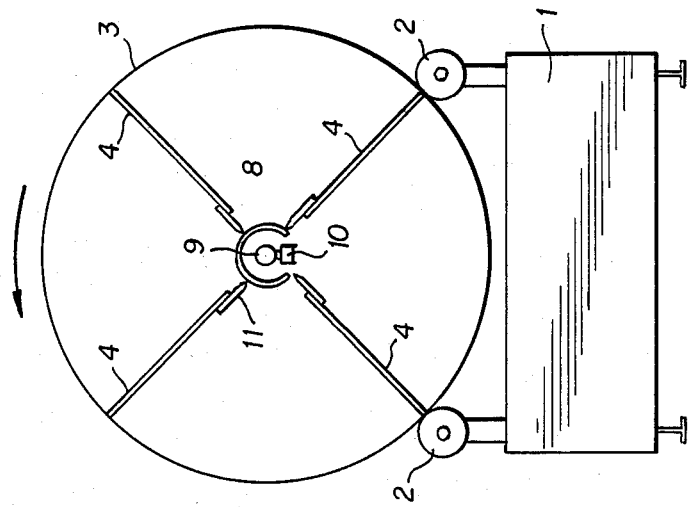
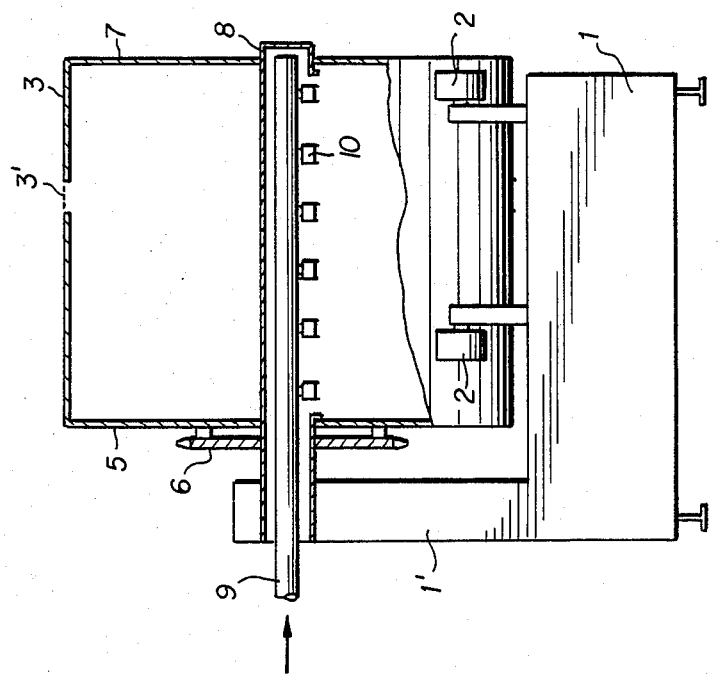
FIG. 2
FIG. 1

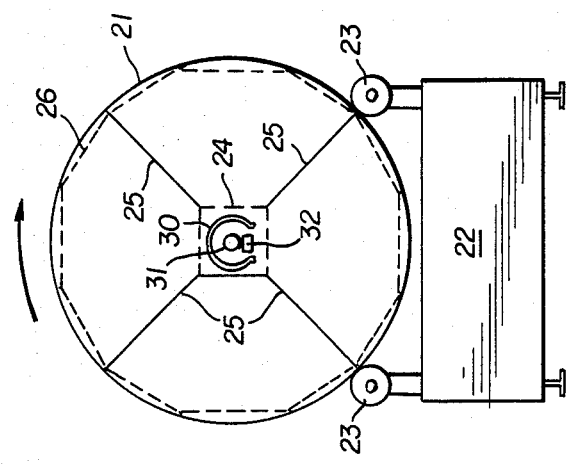
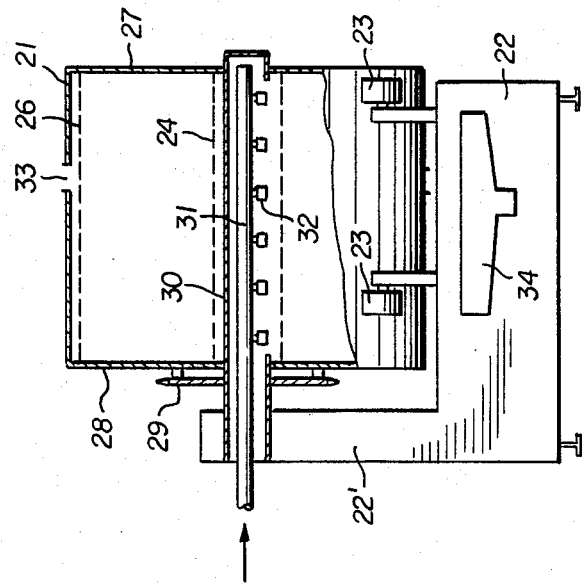

SPROUTING VEGETABLE CULTIVATION APPARATUS

DISCLOSURE OF THE INVENTION

The present invention relates to an apparatus for growing and cultivating vegetables whose sprouts are edible ("sprouting vegetables") such as sprouting beans, alfalfa and Kaiware radishes in a rotary drum in a commercial base, and provides an apparatus in which a pipe-shaped guide having an opening along the longitudinal direction of a rotary drum is provided at the center of said rotary drum and a water spray pipe is provided inside said guide, wherein a proper quantity of water in uniformly fed to sprouting vegetables, while the rotary drum is rotated.

BACKGROUND OF THE INVENTION

The present invention relates to a cultivation apparatus for growing and cultivating vegetables whose sprouts are edible such as sprouting beans, Kaiware radish and alfalfa in a commercial base.

As one of the apparatuses for cultivating these sprouting vegetables, there has been utilized an apparatus in which seeds of sprouting vegetable are charged in a rotary drum which is rotated at a very low velocity or intermittently, and water is intermittently sprayed onto the seeds to grow the sprouting vegetables.

It is very important for growing sprouting vegetables satisfactorily and for rendering them as vegetables of high quality to carry out water spraying uniformly and further to give water in a properly regulated state in answer to the growing conditions of the sprouting vegetables.

In a conventional apparatus, a sufficient quantity of water can be sprayed onto sprouting vegetables in the vicinity of water spraying nozzles, but it is impossible to carry out water spraying uniformly in a rotary drum, because water spraying is carried out from a water spray pipe fixedly attached to the rotary drum.

Furthermore, in a conventional apparatus in which a water spray pipe is fixedly arranged in a rotary drum, sprouting vegetables in the rotary drum collide with the water spray pipe upon rotation of the rotary drum so that seeds and their hulls partially clog its water spraying holes, thus obstructing uniform water spraying. There is another conventional apparatus in which a perforated plate is provided around its water spray pipe so as to prevent collision of sprouting vegetables with the water spray pipe when the water spray pipe is rotated together with the rotary drum. In this apparatus, however, uniform water feeding is hindered and it will be difficult to carry out the regular feed of water.

The present invention provides a sprouting vegetable cultivation apparatus of a novel structure without having such defects as observed in conventional apparatuses, in which the sprouting vegetables of high quality can be harvested.

SUMMARY OF THE INVENTION

The apparatus according to the present invention is characterized in that a pipe-shaped guide having an opening is stationed at the center of rotation of a rotary drum and a water spray pipe is stationed in the guide so as to face to the opening thereof. According to this construction, water is sprayed from the water spray pipe stationed with respect to sprouting vegetables in the rotary drum which moves with the rotation of the rotary drum, whereby uniform water feeding can be carried out onto the sprouting vegetables so as to obtain the sprouting vegetables of high quality.

By regulating the rotating velocity of the rotary drum while the feed of water to the water spray pipe in a quantity enough to conduct water spraying most effectively is always carried out, the spraying of water to the sprouting vegetables in a quantity meeting the condition of its growth and the environment can be carried out.

Although it is difficult to cause the water spray pipe itself to carry out water spraying in a good atomized state while the quantity of water to be fed is regulated, the quantity of water to be sprayed onto the sprouting vegetables can be finely adjusted without causing uneven water spraying, according to the apparatus of the present invention.

In the apparatus according to the present invention, furthermore, the water spray pipe never becomes clogged with seeds or hulls separated therefrom, because the apparatus is so composed that the sprouting vegetables are not in contact with the water spray pipe.

The apparatus according to the present invention has such an advantage in that malfunctioning is difficult to occur and in that such is simple in structure with its water feed pipe and similar structure not being rotated.

In the apparatus according to the present invention, there is utilized a water spray pipe of the above-mentioned construction and also utilized is a rotary drum having perforated boards laid on the inner surface of the rotary drum at an interval spaced therefrom, whereby hulls separated from the seeds of sprouting vegetables due to its sprouting when they are being rolled with the rotation of the rotary drum are caused to flow out through the perforations of the perforated boards accompanied as the water sprayed from the water spraying nozzles, and removed from the sprouting vegetables, so that the clean sprouting vegetables of high quality can be obtained.

According to the present apparatus, an excess quantity of water sprayed during the course of growing can be properly drained through the perforated boards and there does not take place spoiling of sprouting vegetables due to excess water as in a conventional apparatus.

According to the present apparatus, furthermore, vegetables under cultivation will not be damaged, because the impact applied onto the sprouting vegetables due to the rotation of the rotary drum is damped by means of the perforated boards.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIG. 1 and FIG. 2 of the accompanying drawings show one embodiment of the apparatus according to the present invention, wherein FIG. 1 is a side elevational view partially in cross-section to show its interior and FIG. 2 is a front elevational view thereof.

FIG. 3 and FIG. 4 show another embodiment of the apparatus according to the present invention, wherein FIG. 3 is a side elevational view partially in cross-section to show its interior and FIG. 4 is a front elevational view thereof.

DESCRIPTION OF THE PREFERRED EMBODIMENTS

The apparatus according to the present invention will be described with reference to a first embodiment shown in FIG. 1 and FIG. 2.

In the drawings, the reference numeral 1 represents a machine base, on which four support rollers 2 are rotatably arranged. Reference numeral 3 represents a cylindrical rotary drum, and the inside of the rotary drum 3 is partitioned into four sectorial spaces by means of four partition plates 4 radially arranged therein.

The rotary drum 3 has a blind plate 5 fixed on its one end face, and a sprocket 6 on which a chain (not shown) for driving and rotating the rotary drum 3 is to be stretched is attached on the blind plate 5. The other end of the rotary drum 3 is closed by four detachable sectorial doors 7 corresponding to the sectorial shape of each space partitioned by the partition plates 4. This rotary drum 3 is rotatably carried on the support rollers 2 supported by the machine base 1.

On the machine base 1, an upstanding support pillar 1' is provided on which a pipe-shaped guide 8 is secured at the position where it runs through the center of the rotary drum 3 carried on the support rollers 2. The under portion of the guide 8 is cut so as to be open in the longitudinal direction thereof.

A water spray pipe 9 extends in the guide 8, such that water is sprayed in an atomized state into the rotary drum 3 from water spraying nozzles 10 attached thereon through the opening of the guide 8. A flexible slide lip 11 such as rubber is attached on each of the partition plates 4 so that the partition plates 4 can smoothly slide on the outer periphery of the guide 8 when the rotary drum 3 is rotated, as mentioned below. In the drawings, reference numeral 3' represents a drain hole for discharging water fed in the rotary drum 3.

In the above-mentioned apparatus, the sprocket 6 is rotated by the chain which is driven by means of a driving source (not shown) variable in velocity, whereby the rotary drum 3 grows sprouting vegetables in its interior while being rotated on the support rollers 2, for example at the rate of one revolution per hour.

In the rotary drum 3, water spraying is carried out from the water spraying nozzles 10 every several hours to provide water to the sprouting vegetables. Since the water spraying is carried out in a downward direction from the water spraying nozzles 10 which are arranged fixedly in position in the rotary drum 3 in the state of being covered with the guide 8, the water spraying nozzles 10 are never clogged with the sprouting vegetables, and since there is not an obstacle between the water spraying nozzles 10 and the sprouting vegetables in the rotary drum 3, the atomized water sprayed from the water spraying nozzles 10 can be uniformly applied to the sprouting vegetables.

The water spraying can be uniformly applied to all the portions of the sprouting vegetables and sprouting vegetables of uniform quality can be grown, because the water spraying nozzles 10 are stationed in the rotary drum 3 and there is achieved such a state that the sprouting vegetables are passing under the water spraying nozzles 10 as the rotary drum 10 is rotated.

Although a cylindrical drum is used as the rotary drum 3 and it is shown as being rotatably carried on the support rollers 2 in the apparatus which has been described above, a square pillar-shaped drum may be used as the rotary drum and there may be also utilized various means for the supporting system.

Furthermore, the interior of the rotary drum may be partitioned into a proper number of spaces and various types of nozzles may be used as the water spraying nozzles. In addition, the water discharging direction of the water spraying nozzles is not necessarily directly and water may be discharged downward at an angle.

A second embodiment shown in FIG. 3 and FIG. 4 will now be described.

In the drawings, reference numeral 21 represents a rotary drum which comprises a cylinder made of stainless steel or the like. This rotary drum 21 is carried on four support rolls 23 rotatably mounted on a machine base 22, and is rotatably supported above the machine base 22. At the center of the rotary drum 21, a water spray chamber 24 made of a square pillar-like shape by perforated boards is formed in the direction of its longitudinal axis, and four partition walls 15 extend radially from the water spray chamber 24 toward the inner surface of the rotary drum 21 to partition the inside of the rotary drum 21 into four sections.

In the interior of the rotary drum 21, there are attached twelve perforated boards 26 which extend at an interval of 10–30 mm spaced from the inner surface of the rotary drum 21 in the axial direction of the rotary drum 21.

The perforated boards forming the water spray chamber 24 and the perforated boards 26 laid in the rotary drum 21 are made by molding polyethylene, and there will be selected proper values for the size and interval of their perforations in response to the kinds of sprouting vegetables to be grown in the inside. According to the experiments which the applicant conducted, the diameter of the perforations are preferably about 2 mm and the interval between the centers of the perforations is 3 mm in the case of alfalfa.

By detachably mounting the twelve perforated boards 26 in the rotary drum 21 by proper means, it is advantageously possible to adopt perforated boards whose perforations are different in diameter selectively and therefore to carry out washing of the apparatus easily.

End plates 27, 28 of the rotary drum 21 are of transparent boards made of vinyl chloride resin so that the growing condition of the sprouting vegetables in its interior can be observed. The end plate 27 is composed of four sectorial plates corresponding to the four sections partitioned by the partition walls 25, and they are attachable to and detachable from the rotary drum 21 and serve as doors when the sprouting vegetables in each of the sections are taken out at the harvest time.

On the other hand, the end plate 28 has a chain wheel 29 attached thereon and the rotary drum 21 will be rotated by a chain (not shown) engaging with the chain wheel 29, for example at a very low velocity of one to twenty revolutions per hour.

An upstanding support stand 22' is provided on the machine base 22, and a guide 30 whose under side is cut off in part extends from the support stand 22' through the center of the rotary drum 21.

A water spray pipe 31 extends in the guide 30, and water will be sprayed into the rotary drum 21 by water spraying nozzles 32 attached on the water spray pipe 31. From the water spraying nozzles 32, water spraying will be continued for about 3–6 minutes per one revolution of the rotary drum 21 while it is rotated one or two times. In addition, reference numeral 33 in the drawings represents a drain hole formed in the rotary drum 21 and reference numeral 34 represents a drain tray.

In the apparatus which has been described above, for example alfalfa seeds which are still not sprouted after they were dipped in water for about four hours and cured for a period of time as long as twenty hours are charged into the four sections thereof and water is intermittently sprayed onto the alfalfa seeds thereby to grow the sprouting vegetables, while the rotary drum is caused to rotate as mentioned above. Thus, the sprouting alfalfa vegetable as a product can be harvested after about three or four days.

In the embodiment mentioned above, there are used boards made by molding a synthetic resin such as polyethylene as the perforated boards. For cultivating the sprouting vegetables, in general, the perforated boards molded with synthetic resins are more desirable than metal-made plates because they have smaller heat conductivities, but there may be utilized various kinds of perforated members with no limit to these resin-molded boards.

In both the embodiments which have been described above, the cylindrical drum is shown as the rotary drum, but there may be used, for example, a square pillar-shaped drum, without limiting to the cylindrical one. In addition, the numbers of the partition walls 5 and perforated boards 26 may be properly selected, although four walls and twelve boards are used respectively. As a matter of course, the perforated boards 26 may be further shaped in another suitable form, for example in a circular form.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A sprouting vegetable cultivation apparatus, comprising:
    a rotary drum for growing sprouting vegetables, the rotary drum including a plurality of partition plates extending both in a longitudinal and radial direction; a stationary pipe-shaped guide located in said rotary drum and arranged at a center of rotation of said rotary drum and having an opening formed along an underside portion thereof in a longitudinal direction;
    a water spray pipe arranged inside said pipe-shaped guide for spraying water downwardly into the rotary drum through said underside opening of the pipe-shaped guide; and
    a slide lip member connected to a radially inner portion of at least one of said partition plates and contacting said pipe-shaped guide.
2. A sprouting vegetable cultivation apparatus, as set forth in claim 1, further comprising at least one perforated board located on an inner surface of said rotary drum at a predetermined space therefrom.
3. A sprouting vegetable cultivation apparatus as set forth in claim 2, further comprising a water spray chamber formed by a plurality of perforated members so as to surround said pipe-shaped guide and which are connected to each of said partition walls so as to partition an interior portion of said rotary drum into a plurality of sections.

* * * * *